Nov. 1, 1938.    J. W. WHITE    2,134,902
COMBINED MASTER CYLINDER AND STOP LIGHT SWITCH FOR HYDRAULIC BRAKE SYSTEMS
Original Filed Nov. 8, 1923
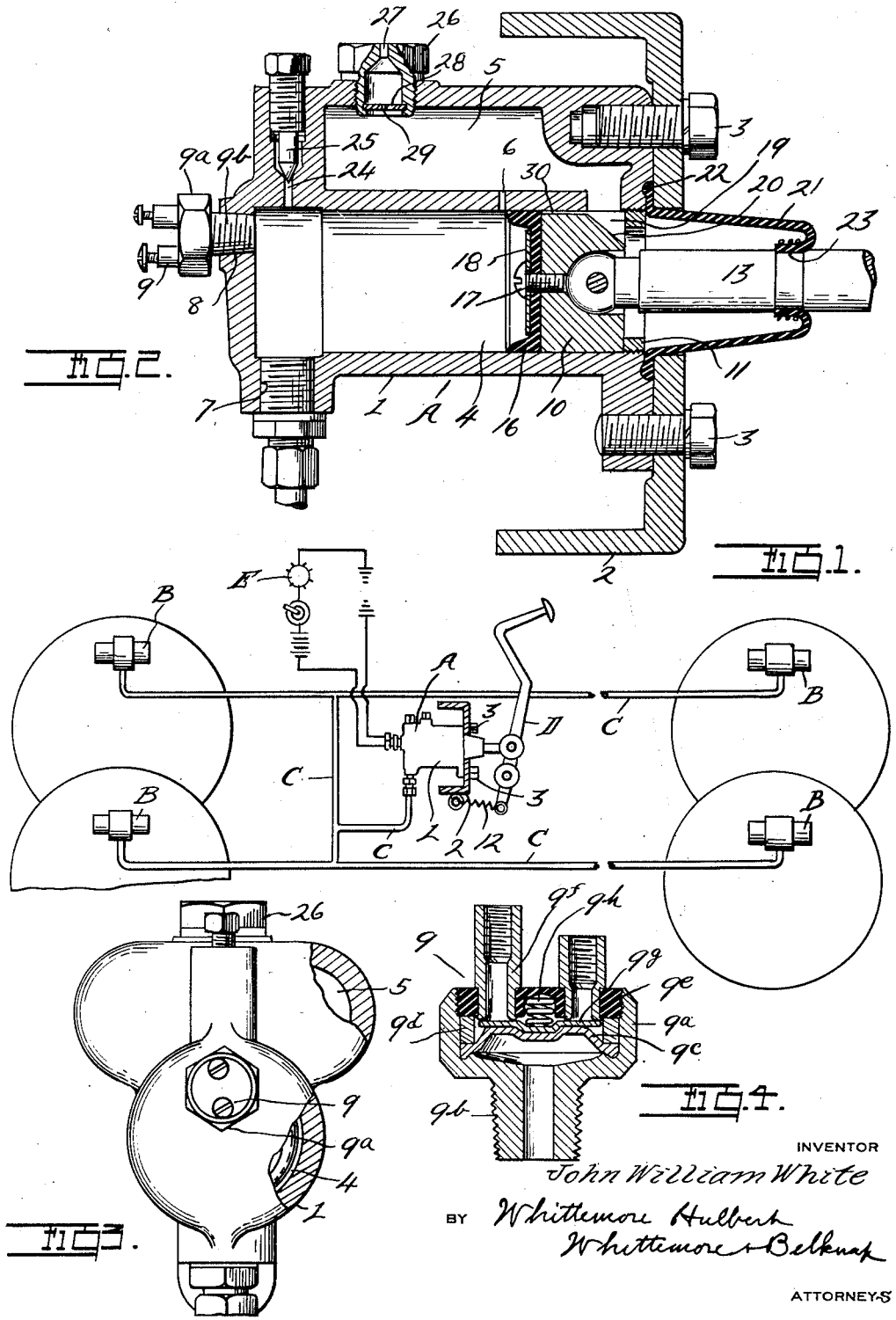

Patented Nov. 1, 1938

2,134,902

UNITED STATES PATENT OFFICE 2,134,902

COMBINED MASTER CYLINDER AND STOP LIGHT SWITCH FOR HYDRAULIC BRAKE SYSTEMS

John William White, Detroit, Mich., assignor, by mesne assignments, to Bendix Products Corporation, a corporation of Indiana Original applications November 8, 1928, Serial No. 317,933, and August 24, 1931, Serial No. 559,109. Divided and this application April 3, 1934, Serial No. 718,863

10 Claims. (Cl. 177—339)

The invention relates to hydraulic vehicle brake systems and forms a division of my co-pending applications for patent, Serial No. 317,933, filed November 8, 1928, and Serial No. 559,109, filed August 24, 1931. The subject matter of the application is the combined master cylinder and stop light switch and it is the primary object of the invention to obtain a construction in which the switch can only be operated to show the light when the hydraulic brake system is in operative condition for applying the brakes. It is a further object to simplify the construction as hereinafter set forth.

In the drawing:

Fig. 1 is a diagrammatic view illustrating a system embodying this invention;

Fig. 2 is a sectional view on a large scale of the master cylinder by which pressure is applied upon the fluid in the system;

Fig. 3 is an end elevation of such cylinder; certain parts being broken away;

Fig. 4 is a section through the electric switch.

The brake system which embodies one application of this invention is illustrated in Fig. 1 as comprising a master cylinder A by which pressure is applied to the fluid, a plurality of brake cylinders B by which the pressure on the fluid is transmitted to the wheels and conduits C connecting the master cylinder with the brake cylinders. Pressure is created in the master cylinder A by any suitable means as by a brake pedal D and the operation of the master cylinder actuates a stop light E. The master cylinder A is separately illustrated in Figs. 2 and 3 and as is shown, comprises a casing 1 suitably mounted upon a cross channel member 2 of a motor vehicle, being secured thereto by bolts 3. Within the casing 1 is a pumping chamber 4 and a reservoir or supply chamber 5 which chambers are connected by a port 6. At the forward or inner end of the chamber 4 are outlets 7 and 8, the outlet 7 leading to the conduit C and thence to the brake cylinders B and the outlet 8 receiving a stop light switch 9 by which the stop light E is controlled.

The switch 9 is substantially that set forth in my prior Patent No. 1,840,340, issued January 12, 1932. As shown in Fig. 4, it comprises the casing $9^a$ having a threaded nipple $9^b$ for engaging the outlet 8, and a chamber within the casing containing a flexible diaphragm $9^c$ peripherally clamped by a ring $9^d$. A cover of insulating material $9^e$ closes the casing and terminal posts $9^f$ are mounted on and project through this cover plate. $9^g$ is a metallic bridge contact for electrically connecting the terminal posts $9^f$ with each other. $9^h$ is a spring for normally holding the bridge contact $9^g$ away from the posts and against the flexible diaphragm $9^c$. The construction is such that when fluid within the pump chamber 4 is under sufficiently high pressure the diaphragm $9^c$ will be flexed and the bridge contact $9^g$ pressed against the terminal posts $9^f$ against the tension of the spring $9^h$.

The detailed construction of the master cylinder is not essential, but as shown a piston 10 is arranged within the chamber 4 and is actuated by a brake lever D. The piston normally rests against a stop ring 11 at the mouth of the chamber, being held in such position by a spring 12 attached to the lever D and anchored to the channel member 2. A rod 13 extends between the piston and the lever D passing through an aperture in the cross channel member 2 and being pivotally attached to the piston and to the lever. Mounted on the inner end of the piston 10 is a flexible cup 16 preferably of rubber, secured in place by a screw 17 and washer 18.

The chambers 4 and 5 are connected not only by the port 6 but also by a passage 19, the outer end of the piston 10 being cut away at 20 so that the passage 19 is open regardless of the position of the piston 10. Surrounding the inner end of the rod 13 is a boot 21 preferably conical and of flexible material. The inner and larger end of the boot 21 is clamped between the casing 1 and the cross member 2 by the bolts 3, an annular recess 22 being formed in the outer wall of the casing to receive the edge of the boot. The outer and small end of the boot is inverted as shown in Fig. 2 and wired or otherwise rigidly secured in a recess 23 on the rod 13. The ends of the boot are thus sealed and the interior of the boot is in direct communication not only with the chamber 4 but also with the chamber 5 through the passage 19.

A filling orifice 24 entering the chamber 4 is provided in the casing 1 and is sealed by a needle valve 25. Threaded into the storage chamber 5 is a breather cap 26 having a passage 27 therethrough. The upper end of the passage 27 is open at all times to the atmosphere but across the lower end of the passage 27 is a disk 28 of rubber or other flexible material, secured at its periphery to the cap 26 and provided with intersecting slots 29. The disk 28 normally closes the passage 27 but any vacuum in the chamber 5 will be broken or any excess in air pressure therein will be relieved by a flexing of the disk and a consequent opening of the slots. One or more longitudinally extending grooves 30 in the piston to allow liquid to enter the cylinder chamber 4 past the cup 16 when a minus pressure is set up in the chamber.

As the present invention relates to the master cylinder in combination with the fluid actuated electric switch, it will be unnecessary to describe the entire brake system in detail. In operation, the actuation of the pedal D will move the piston in the chamber 4, expelling fluid through the orifice 7 and conduit C to the several wheeled cylinders, causing the actuation of the same and the application of the brakes. When the pressure upon the fluid in the chamber 4 is sufficient to apply the brakes, it will also actuate the switch 9, moving the flexible diaphragm 9c and bridge contact 9g against the resistance of the spring 9h and electrically connecting the terminal posts 9f. If on the other hand through some defect in the system the pressure in the chamber 4 is insufficient for operating the brakes, then it will also be insufficient to actuate the electric switch 9. Thus the switch 9 in addition to its function of operating the stop light is an indicator of the operativeness of the brake system. It is thus possible for the operator to test his brakes when the car is standing still and if he is unable to actuate the switch 9 and display the light, he is assured that the brakes are not in condition for use.

What I claim as my invention is:

1. In combination, a hydraulic brake system that includes a master control container, means for forcibly contracting at will the control container, liquid operated brakes, piping leading from the interior of said master control container to said brakes, and an incompressible liquid within and filling the master control container and the pipes leading therefrom to the brakes; an electric system that includes a source of current supply, a signal and an electric switch having a movable contact member controlled as to switch opening and closing movements by a positionable member of a switch control container; and said switch control container that provides said positionable member for controlling the switch opening and closing movements of the movable contact according to pressure conditions of the incompressible liquid within the switch control container; said switch control container being in direct communication with the liquid containing space of the hydraulic brake system whereby upon force being applied in a manner to effect a contracting of the master control container there simultaneously results an increase in the pressure of the liquid and which increase of pressure is exerted against the movable member of the switch control container as well as against the brake parts that are under the direct influence of the incompressible liquid in the hydraulic brake system.

2. In combination, a hydraulic brake system that includes an expansible and contractible master control container, a foot pedal for forcibly contracting the same, liquid operated brakes, piping leading from the interior of said master control container to said brakes and an incompressible liquid within and filling the master control container and the pipes leading from the master container to the brakes; an electric system that includes a source of current supply, a signal and an electric switch having a movable contact member for determining the opening and closing of said electric switch; and an expansible and contractible switch control container which provides a movable member for positioning the movable contact according to pressure conditions within the switch control container; said switch control container being in direct communication with the liquid containing space of the hydraulic brake system.

3. In combination, a hydraulic brake system that includes an expansible and contractible master control container, means for forcibly contracting the same, liquid operated brakes, piping leading from the interior of said master control container to said brakes, and an incompressible liquid within and filling the master control container and the pipes leading therefrom to the brakes; an electric system that includes a source of current supply, a signal and an electric switch having a movable contact member; and an expansible and contractible switch control container which provides a movable member for positioning the movable contact to switch opening and closing position according to pressure conditions within the switch control container; said switch control container being in direct communication with the liquid containing space or sections of the hydraulic brake system and operable therefrom whereby upon force being exerted in a manner to effect a contracting of the master control container there is effected a simultaneous increase in pressure that is exerted against the movable member of the switch control container with a consequent positioning of the movable contact of the electric switch, and also an effective operation of the hydraulic brakes.

4. In a motor vehicle of the automobile type, the combination of a hydraulic brake system that is dependent for its functioning upon a relatively incompressible liquid contained and maintained within the system, and a signal means that includes a diaphragm having a liquid contact with the hydraulic brake system and operable under the influence of the liquid pressure in said hydraulic brake system to cause a giving of a signal when the liquid pressure is increased incident to the application of the brakes and to cause a discontinuance of the signal when the liquid pressure is decreased incident to the release of the brakes.

5. In a motor vehicle of the automobile type, the combination of a hydraulic brake system that is dependent for its functioning upon forces transmitted through a relatively incompressible liquid maintained within the system, an electrical circuit including a signal and a source of current supply, an electrical switch including a diaphragm having a liquid contact with the hydraulic brake system, said switch having one of its contact members movable under the influence of pressure of the liquid in said hydraulic brake system on said diaphragm to make and break said circuit whereby incident to an application of the brakes the signal is given and whereby incident to a release of the brakes there is a discontinuance of the signal.

6. In a motor vehicle of the automobile type, the combination of a hydraulic brake system within which the relatively incompressible liquid upon which the system is dependent for its functioning is maintained, and a signal system that includes and is dependent for its functioning upon a diaphragm having a liquid contact with the hydraulic brake system and which diaphragm is under the influence of pressure of the liquid in said hydraulic brake system for effecting a giving of the signal when the pressure on the liquid is increased incident to the application of the brakes and for effecting a discontinuance of the signal incident to a release of the brakes.

7. In a motor vehicle of the automobile type, in combination, a hydraulic brake system which is dependent for its functioning upon relatively incompressible liquid continuously confined therein, and a signal means having a diaphragm for controlling the giving and discontinuance of the signal, which said diaphragm has liquid contact with the hydraulic brake system and is movable under the influence of the pressure of the liquid in said hydraulic brake system so as to cause a giving of the signal incident to brake application and so as to cause a discontinuance of the signal incident to brake release.

8. In an automobile, the combination of a hydraulic brake system dependent for its functioning upon a suitable liquid maintained therein, said system including brakes and a brake pedal operable to apply said brakes by hydraulic pressure, a signal, and means for controlling the operating of said signal which said means comprises a diaphragm having a liquid contact with the hydraulic brake system and positionable for causing the signal to be given upon the applying of the brake and for causing a discontinuance of the signal upon the release of the brakes.

9. For use on an automobile, the combination of a hydraulic braking system including a master cylinder and motor cylinders connected thereto, substantially incompressible hydraulic fluid contained in said system and through which pressure is transmitted from said master cylinder to said motor cylinders, a signal, and means for controlling the operation of said signal dependent upon pressure in said substantially incompressible hydraulic fluid.

10. In an automobile, the combination of a hydraulic brake system dependent for its functioning upon a substantially incompressible suitable liquid contained therein, said system including brakes and a brake pedal operable to apply said brakes by hydraulic pressure, a signal, and means for controlling the operation of said signal comprising an element positionable for causing the signal to be given upon the applying of the brakes and for causing a discontinuance of the signal upon the release of the brakes.

JOHN WILLIAM WHITE.